US010370794B2

(12) United States Patent
Taguchi et al.

(10) Patent No.: US 10,370,794 B2
(45) Date of Patent: Aug. 6, 2019

(54) METHOD FOR PRODUCING PAPER, AND PITCH REMOVAL AGENT

(71) Applicants: KURITA WATER INDUSTRIES LTD., Tokyo (JP); THE NIPPON SYNTHETIC CHEMICAL INDUSTRY CO., LTD., Osaka-shi, Osaka (JP)

(72) Inventors: Chigusa Taguchi, Tokyo (JP); Munetoshi Tomita, Osaka (JP); Hiroki Takeda, Osaka (JP)

(73) Assignees: KURITA WATER INDUSTRIES LTD., Tokyo (JP); MITSUBISHI CHEMICAL CORPORATION, Tokyo (JP)

( * ) Notice: Subject to any disclaimer, the term of this patent is extended or adjusted under 35 U.S.C. 154(b) by 77 days.

(21) Appl. No.: 15/123,528

(22) PCT Filed: Mar. 11, 2015

(86) PCT No.: PCT/JP2015/057967
§ 371 (c)(1),
(2) Date: Sep. 2, 2016

(87) PCT Pub. No.: WO2015/137521
PCT Pub. Date: Sep. 17, 2015

(65) Prior Publication Data
US 2017/0073891 A1   Mar. 16, 2017

(30) Foreign Application Priority Data

Mar. 11, 2014 (JP) ................................. 2014-048237
Mar. 10, 2015 (JP) ................................. 2015-046941

(51) Int. Cl.
*D21C 9/08* (2006.01)
*D21B 1/32* (2006.01)
(Continued)

(52) U.S. Cl.
CPC ............... *D21C 9/086* (2013.01); *D21B 1/32* (2013.01); *D21B 1/325* (2013.01); *D21C 5/025* (2013.01);
(Continued)

(58) Field of Classification Search
CPC . D21B 1/325; D21B 1/32; D21C 9/08; D21C 9/086; D21H 21/02; D21H 11/14
See application file for complete search history.

(56) References Cited

U.S. PATENT DOCUMENTS 4,871,424 A * 10/1989 Dreisbach ............... D21C 9/008
162/168.1
2006/0048908 A1 * 3/2006 Wang ..................... D21C 9/08
162/199

FOREIGN PATENT DOCUMENTS

JP    S61-055294 A    3/1986
JP    H03-051389 A    3/1991
(Continued)

OTHER PUBLICATIONS

Budhalall et al., Characterization of Partially Hydrolyzed Poly(vinyl alcohol). Effect of Poly(vinyl alcohol) Molecular Architecture on Aqueous Phase Conformation, 2003, Macromolecules, 36, p. 9477-9484.*
(Continued)

*Primary Examiner* — Anthony Calandra
(74) *Attorney, Agent, or Firm* — Manabu Kanesaka

(57) ABSTRACT

Provided is a method for producing paper and a pitch removal agent that can remove pitch efficiently.
A pitch removal agent having an average polymerization degree of 300 to 2500, a saponification index of 70 to 88 mol % and satisfying, when the absorbance at a wavelength of 490 nm is designated as y (Abs) and the saponification index as x (mol %), the Numerical Formula (A) below is added to
(Continued)

a pulp slurry during production of paper using waste paper in the step of deinking the waste paper by floatation and/or a step earlier:

$$y = -0.0297x + b \qquad (A)$$

(wherein, $70 \leq x \leq 88$ and $2.80 \leq b \leq 3.03$).

5 Claims, 9 Drawing Sheets

(51) Int. Cl.
*D21H 11/14* (2006.01)
*D21H 21/02* (2006.01)
*D21H 17/36* (2006.01)
*D21C 5/02* (2006.01)

(52) U.S. Cl.
CPC .............. *D21C 5/027* (2013.01); *D21C 9/08* (2013.01); *D21H 11/14* (2013.01); *D21H 17/36* (2013.01); *D21H 21/02* (2013.01); *Y02W 30/648* (2015.05)

(56) References Cited

FOREIGN PATENT DOCUMENTS

| JP | H03-076885 A | 4/1991 |
| JP | H08-509789 A | 10/1996 |
| JP | 2005-350807 A | 12/2005 |
| JP | 2006-328560 A | 12/2006 |

OTHER PUBLICATIONS

Yoshinaga et al., Polyvinyl Alcohol as a Useful Indicator on Iodometry: Volumetric and Spectrophotometric Studies on Iodine-PVA and Iodine Starch Complexes, 2001, Analytical Sciences, vol. 17, p. 333-337.*

PCT/ISA/210, "International Search Report for International Application No. PCT/JP2015/057967," dated Jun. 9, 2015.

Notification of Reasons for Refusal; Japanese Application No. 2015-046941.

* cited by examiner

20 μm

20 μm

METHOD FOR PRODUCING PAPER, AND PITCH REMOVAL AGENT

RELATED APPLICATIONS

The present application is National Phase of International Application No. PCT/JP2015/057967 filed Mar. 11, 2015, and claims priority from Japanese Applications No. 2014-048237, filed Mar. 11, 2014; and No. 2015-046941, filed Mar. 10, 2015, the disclosure of which is hereby incorporated by reference herein in its entirety.

TECHNICAL FIELD

The present invention relates to a method for producing paper using waste paper and a pitch removal agent used in the method for producing paper. More specifically, it relates to a technology for removing pitch from a pulp slurry.

BACKGROUND ART

Under recent increase of waste paper recovery rate, low-quality waste paper is also recycled as raw materials for paper making. For that reason, the amount of pitch introduced into paper-making system is increasing year by year in papermaking step. Proposed as the conventional methods for suppressing flocculation of pitch and deposition thereof on apparatuses in the papermaking step were methods of using polyvinyl alcohol (see, for example, Patent Documents 1 and 2).

It is considered that polyvinyl alcohol, which has hydrophobic and hydrophilic groups, prevents deposition of pitch on wire, because the hydrophobic groups bind to the pitch hydrophobically and the hydrophilic groups disperse the pitch. Thus in the case of conventional pitch control agents, the block nature of the hydrophobic groups and the saponification index of polyvinyl alcohols were studied.

CITATION LIST

Patent Literatures

[Patent Document 1] JP-A No. S61-55294
[Patent Document 2] JP-A No. 2005-350807

SUMMARY OF INVENTION

The method for producing paper according to the present invention is a method for producing paper using waste paper, comprising adding, to the pulp slurry in the step of deinking the waste paper by floatation and/or a step earlier, a polyvinyl alcohol having an average polymerization degree of 300 to 2500, a saponification index of 70 to 88 mol %, and an absorbance at a wavelength of 280 nm in the ultraviolet absorption spectrum of its 0.1 mass % aqueous solution of 0.1 Abs or more and satisfying, when the iodine absorbance at a wavelength of 490 nm is designated as y (Abs) and the saponification index as x (mol %), the following Numerical Formula (A):

[Numerical Formula 1]

$$y = -0.0297x + b \quad (A)$$

(wherein, $70 \leq x \leq 88$ and $2.80 \leq b \leq 3.03$).

The pitch removal agent according to the present invention is a pitch removal agent added to the pulp slurry during production of paper using waste paper in the step of deinking the waste paper by floatation and/or a step earlier, the pitch removal agent containing a polyvinyl alcohol having an average polymerization degree of 300 to 2500, a saponification index of 70 to 88 mol %, and an absorbance at a wavelength of 280 nm in the ultraviolet absorption spectrum of its 0.1 mass % aqueous solution of 0.1 Abs or more and satisfying, when the iodine absorbance at a wavelength of 490 nm is designated as y (Abs) and the saponification index as x (mol %), the Numerical Formula (A) above.

DESCRIPTION OF EMBODIMENTS

Figure 1:
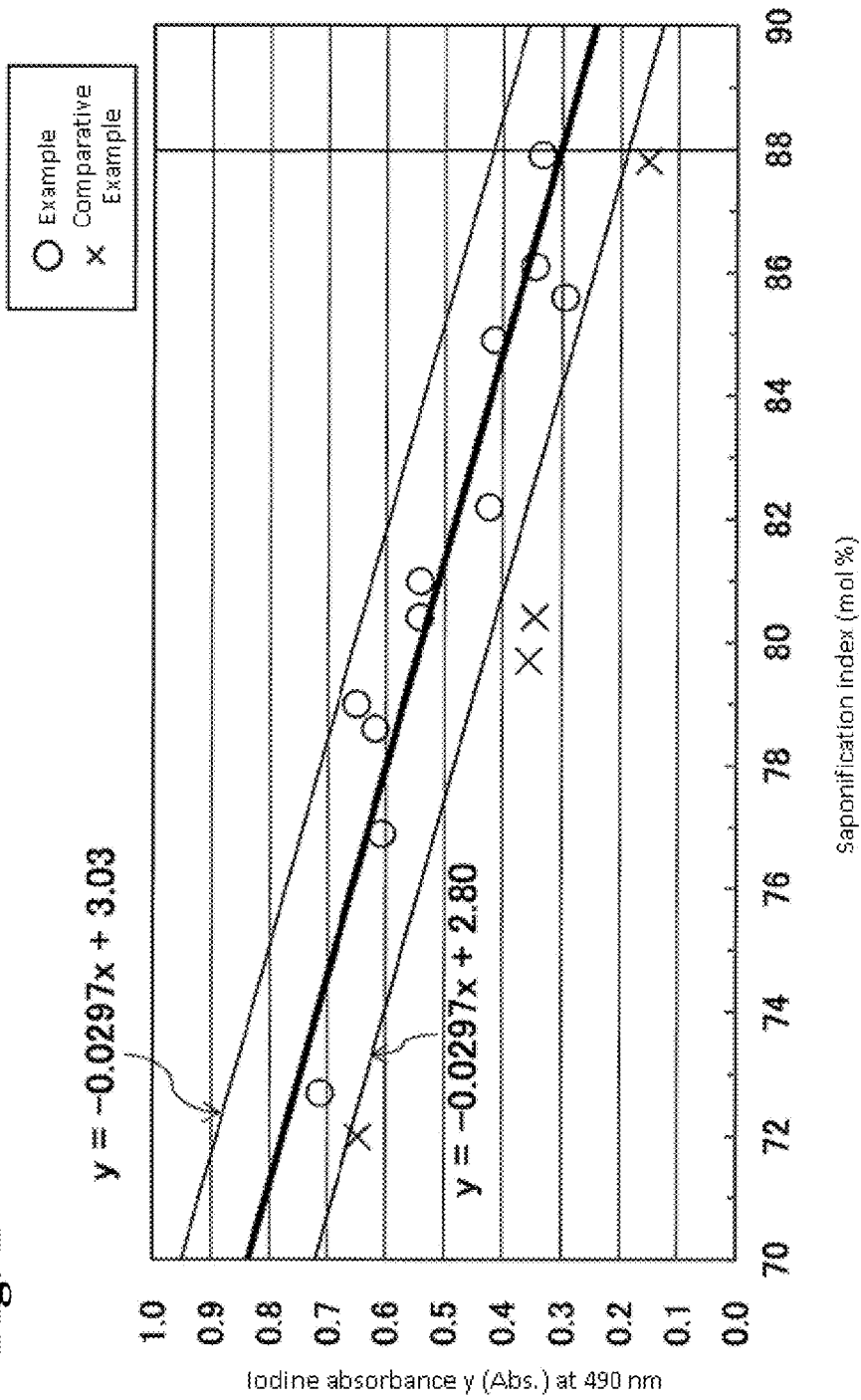
FIG. 1 is a figure showing the relationship between saponification index x and iodine absorbance y, wherein the saponification index x is plotted on the abscissa and the iodine absorbance y at 490 nm on the ordinate.
Figure 2:
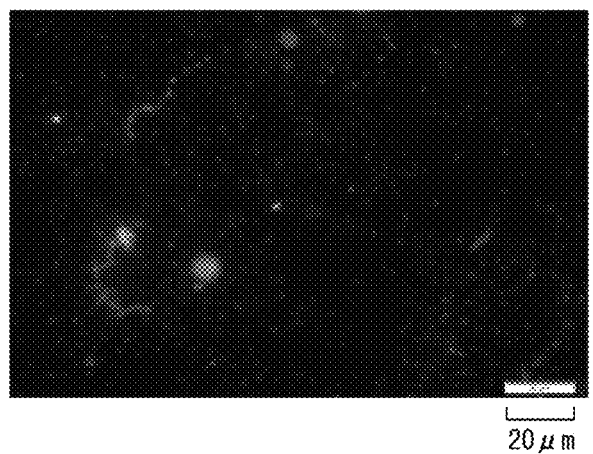
FIG. 2 is a photograph showing the solution prepared in Example 1, as observed under fluorescence microscope.
Figure 3:
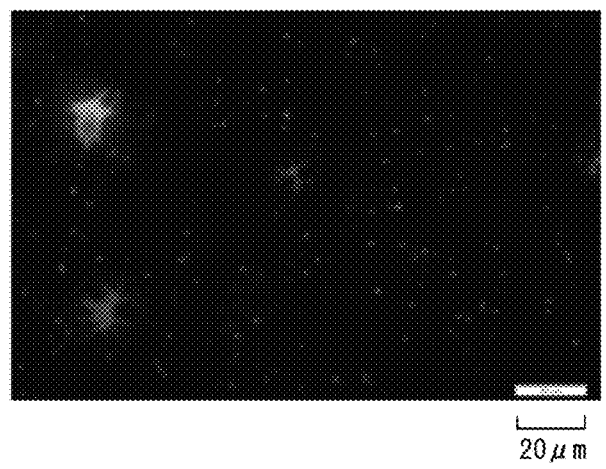
FIG. 3 is a photograph showing the solution prepared in Example 2, as observed under fluorescence microscope.
Figure 4:
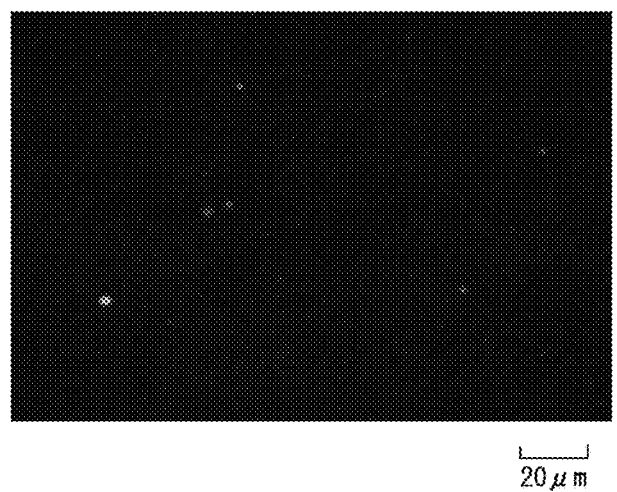
FIG. 4 is a photograph showing the solution prepared in Example 3, as observed under fluorescence microscope.
Figure 5:
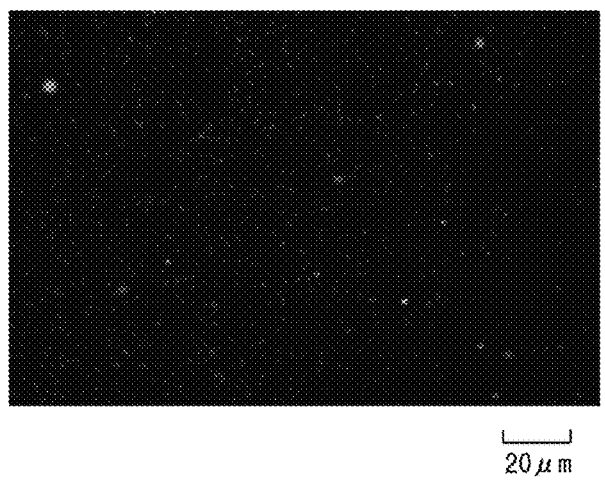
FIG. 5 is a photograph showing the solution prepared in Example 4, as observed under fluorescence microscope.
Figure 6:
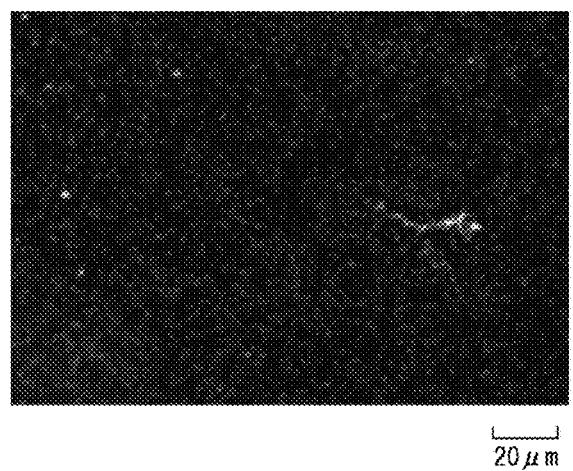
FIG. 6 is a photograph showing the solution prepared in Example 5, as observed under fluorescence microscope.
Figure 7:
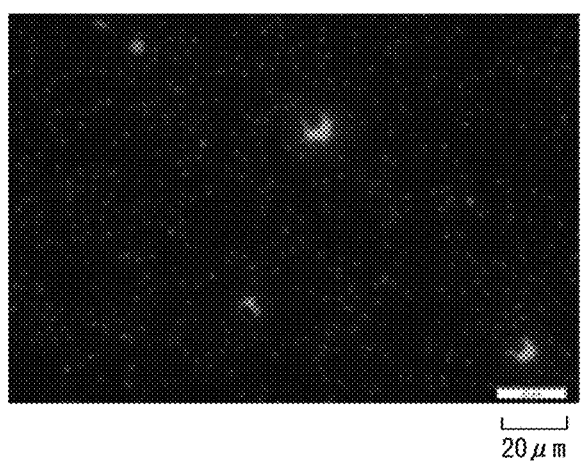
FIG. 7 is a photograph showing the solution prepared in Example 6, as observed under fluorescence microscope.
Figure 8:
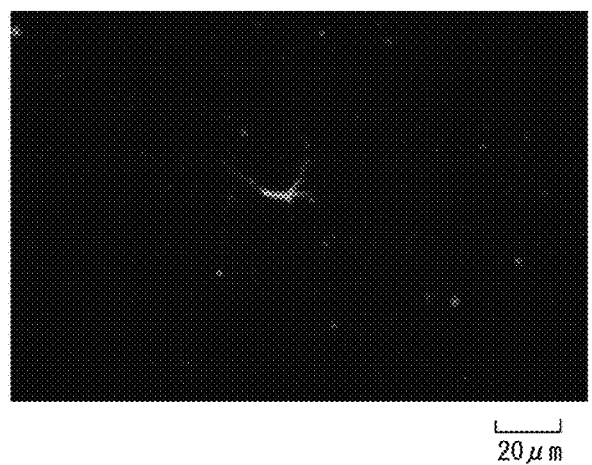
FIG. 8 is a photograph showing the solution prepared in Example 7, as observed under fluorescence microscope.
Figure 9:
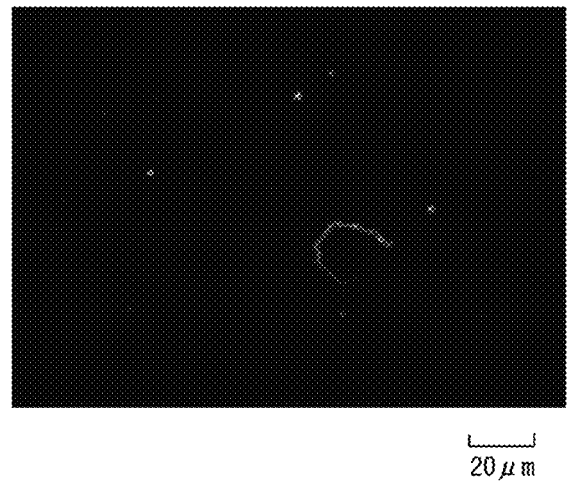
FIG. 9 is a photograph showing the solution prepared in Example 8, as observed under fluorescence microscope.
Figure 10:
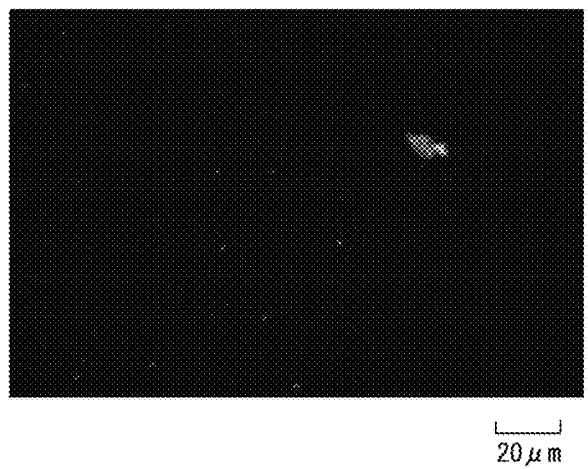
FIG. 10 is a photograph showing the solution prepared in Example 9, as observed under fluorescence microscope.
Figure 11:
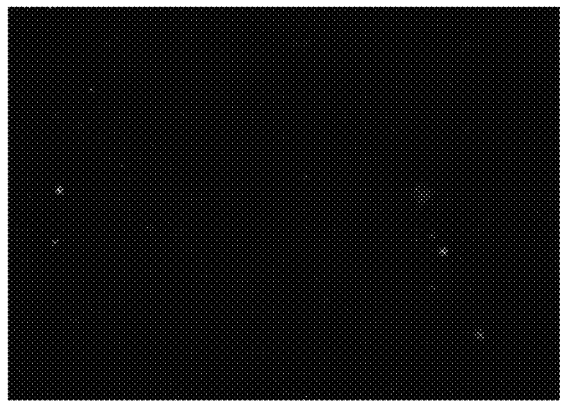
FIG. 11 is a photograph showing the solution prepared in Example 10, as observed under fluorescence microscope.
Figure 12:
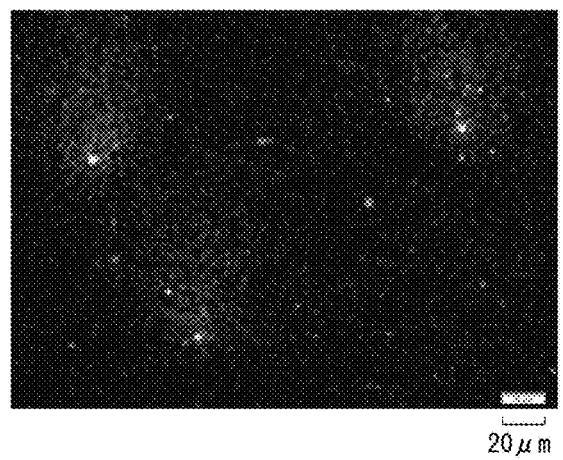
FIG. 12 is a photograph showing the solution prepared in Example 11, as observed under fluorescence microscope.

Conventional pitch control agents containing polyvinyl alcohol did not show sufficient effectiveness, when added to paper-making system. The block nature of the polyvinyl alcohol is known to be influenced by the saponification index and cannot be sufficiently specified only by the amount of remaining acetic acid groups, as in the case of the pitch control agents described in Patent Document 2. As a greater amount of water is recycled and reused recently in the paper-making step, if the pitch is only dispersed in the paper-making system, the pitch recirculates with the circulation water and is concentrated therein, possibly resulting in worsening of pitch troubles.

Thus in an embodiment of the present invention, an object of the present invention is to provide a method for producing paper and a pitch removal agent that can remove pitch efficiently.

In the embodiment of the present invention, it is possible to remove pitch efficiently, as a polyvinyl alcohol in a particular structure is added to the pulp slurry.

Hereinafter, favorable embodiments of the invention will be described in detail. It should be understood that the present invention is not limited to the embodiments described below.

After intensive studies to overcome the problems described above, the inventors have found a method of discharging pitch out of the system by selectively transferring the pitch into the froth with foams in the floatation step of deinking crude waste paper material and thus reducing the amount of the pitch fed into the papermaking system. The chemical agent used then is desirably a polyvinyl alcohol higher in the block nature of the residual acetic acid groups.

The block nature of the residual acetic acid groups can be specified in a linear relationship, using the iodine absorbance and the saponification index of the polyvinyl alcohol. The "residual acetic acid groups," as used herein, are the acetic acid groups that remain intact, as they are not hydrolyzed to hydroxyl groups, in the saponification step for production of the polyvinyl alcohol.

Accordingly, the method for producing paper in an embodiment of the present invention is a method for producing paper using waste paper, comprising adding, to the pulp slurry in the step of deinking the waste paper by floatation and/or a step earlier, a pitch removal agent containing a polyvinyl alcohol having an average polymerization degree of 300 to 2500, a saponification index of 70 to 88 mol %, and an absorbance at a wavelength of 280 nm in the ultraviolet absorption spectrum of its 0.1 mass % aqueous solution of 0.1 Abs or more and satisfying, when the iodine absorbance at a wavelength of 490 nm is designated as y (Abs) and the saponification index as x (mol %), the Numerical Formula (A) below. The following Numerical Formula (A) is an approximation formula obtained by plotting the saponification index of the polyvinyl alcohols evaluated in Examples on X axis and the iodine absorbance thereof on Y axis.

[Numerical Formula 2]

$$y=-0.0297x+b \quad (A)$$

(wherein, $70 \leq x \leq 88$ and $2.80 \leq b \leq 3.03$).

[Polyvinyl Alcohol]

Hereinafter, the polyvinyl alcohol contained in the pitch removal agent used in the method for producing paper in the present embodiment will be described. The polyvinyl alcohol contained in the pitch removal agent has a saponification index of 70 to 88 mol %. When the polyvinyl alcohol has a saponification index of less than 70 mol %, it is excessively more hydrophobic, making the pitch removal agent less soluble in water. Alternatively when it has a saponification index of more than 88 mol %, it becomes less hydrophobic, making the pitch removal agent not capable of selectively transferring the pitch into froth.

The saponification index of the polyvinyl alcohol is preferably 73 to 88 mol %, more preferably 82 to 86 mol %, form the viewpoints of solubility in water and pitch-removing efficiency.

The polyvinyl alcohol contained in the pitch removal agent has an average polymerization degree of 300 to 2500. When the polyvinyl alcohol has an average polymerization degree of less than 300, the pitch removal agent cannot form flocks of sufficiently large size. Alternatively when the polyvinyl alcohol has an average polymerization degree of more than 2500, the flocks formed cannot easily float with foams. The average polymerization degree of the polyvinyl alcohol is preferably 400 to 2000, more preferably 500 to 1500, from the viewpoint of flock size and floating efficiency.

The polyvinyl alcohol contained in the pitch removal agent has an absorbance at a wavelength of 280 nm in the ultraviolet absorption spectrum of its 0.1 mass % aqueous solution of 0.1 Abs or more. The absorbance at a wavelength of 280 nm is an indicator of the double bonds adjacent to terminal carbonyl groups contained in the structure of the polyvinyl alcohol and, when the value is less than 0.1 Abs, the pitch flocculation efficiency may become lowered. The absorbance of the polyvinyl alcohol at a wavelength of 280 nm is preferably 0.2 to 1.0 Abs, more preferably 0.3 to 0.5 Abs, for improvement of the pitch flocculation efficiency.

Further, the polyvinyl alcohol contained in the pitch removal agent preferably has a block nature of the residual acetic acid groups in a particular range and, in the present embodiment, a polyvinyl alcohol having a relationship between the iodine absorbance y at a wavelength of 490 nm and the saponification index x satisfying the Numerical Formula (A) is used. A polyvinyl alcohol having an intercept b of less than 2.80 in the relationship between the iodine absorbance y at a wavelength of 490 nm and the saponification index x and thus not satisfying the Numerical Formula (A) does not show sufficient block nature and leads to deterioration of pitch flocculation efficiency when used in the pitch removal agent.

Alternatively, a polyvinyl alcohol having an intercept b of more than 3.03 in the relationship between the iodine absorbance y at a wavelength of 490 nm and the saponification index x and thus not satisfying the Numerical Formula (A) is less dispersible in water and does not sufficiently react with pitch, leading to deterioration of the pitch-removing efficiency, when used in the pitch removal agent.

The polyvinyl alcohol described above is prepared, for example, by saponifying a vinyl ester-based polymer obtained by polymerizing one or more vinyl ester compounds. Examples of the vinyl ester compounds include vinyl formate, vinyl acetate, vinyl trifluoroacetate, vinyl propionate, vinyl butyrate, vinyl caprate, vinyl laurylate, vinyl versatate, vinyl palmitate, vinyl stearate, vinyl pivalate, and the like. These vinyl ester compounds may be used alone or in combination of two or more. Practically, use of vinyl acetate, among the vinyl ester compounds above, is preferable from the economic viewpoint.

A polyvinyl alcohol having an absorbance of 0.1 Abs or more at a wavelength of 280 nm in the ultraviolet absorption spectrum is prepared by oxidizing the polyvinyl alcohol produced by the method described above with an oxidizing agent such as hydrogen peroxide. Alternatively, it can be produced, for example, by a method of polymerizing a vinyl compound in the presence of a carbonyl group-containing chain-transfer agent such as an aldehyde or a ketone and then saponifying the polymer obtained, a method of polymerizing the monomer for example in the presence of 1-methoxyvinyl acetate and saponifying the polymer, or a method of preparing polyvinyl acetate by supplying air into the polymerization system during polymerization and then saponifying the polymer obtained.

Industrially, a method for manufacturing a carbonyl group-containing polyvinyl alcohol by polymerizing vinyl acetate in the presence of a chain-transfer agent containing carbonyl group, such as an aldehyde or a ketone, and then saponifying the polyvinyl acetate obtained is particularly advantageous.

Examples of the chain-transfer agents used then include aldehydes such as acetaldehyde, propionaldehyde, n-butyraldehyde, benzaldehyde, and crotonaldehyde; and ketones such as acetone, methyl ethyl ketone, hexanone, and cyclohexanone. In particular among the chain-transfer agents above, acetaldehyde, benzaldehyde, propionaldehyde, and n-butyraldehyde are preferable, from the points of the easiness of controlling chain transfer of the vinyl acetate to the carbonyl compound. The chain-transfer agents described above may be used alone or in combination of two or more.

The addition amount of the chain-transfer agent described above may be varied properly according to the chain transfer constant and the polymerization degree of the polyvinyl alcohol produced, but normally, preferably 0.05 to 5 mass %, more preferably 0.1 to 3 mass % with respect to the raw monomer vinyl ester compounds used, such as vinyl acetate. The chain-transfer agent may be added all at once in the early phase of polymerization or gradually in portions during polymerization. It is possible by supplying the chain-transfer agent by an arbitrary method to control the molecular weight distribution of the polyvinyl alcohol.

Alternatively, a polyvinyl alcohol having an iodine absorbance satisfying the Numerical Formula (A) above can be prepared, for example, by a method of controlling the dielectric constant of the saponification solvent used in the polyvinyl alcohol production process. Specifically in saponification of the vinyl ester-based polymer, one of the following solvents having a dielectric constant of 32 CGS esu or less is used.

Examples of the solvents having a dielectric constant of 32 CGS esu or less include methanol (31.2 CGS esu), a mixed solvent of methyl acetate/methanol=1/3 (mass ratio) (25.2 CGS esu), a mixed solvent of methyl acetate/methanol=1/1 (mass ratio) (19.1 CGS esu), a mixed solvent of methyl acetate/methanol=3/1 (mass ratio) (13.1 CGS esu), methyl acetate (7.03 CGS esu), isopropyl acetate (6.3 CGS esu), trichloroethylene (3.42 CGS esu), xylene (2.37 CGS esu), toluene (2.38 CGS esu), benzene (2.28 CGS esu), acetone (21.4 CGS esu), and the like. It is also possible to adjust the dielectric constant of the saponification solvent by adding water (86.4 CGS esu).

In addition to the unmodified polyvinyl alcohols only containing vinyl alcohol and vinyl ester units, various modification group-containing polyvinyl alcohols can also be used.

Examples of the monomers used for copolymerization with the vinyl ester monomer in preparation of the polyvinyl alcohols having a functional group introduced by copolymerization include olefins such as ethylene, propylene, isobutylene, α-octene, α-dodecene, and α-octadecene; hydroxy group-containing α-olefins such as 3-buten-1-ol, 4-penten-1-ol, 5-hexen-1-ol, 3,4-dihydroxy-1-butene, and the derivatives thereof such as acrylates; unsaturated acids such as acrylic acid, methacrylic acid, crotonic acid, maleic acid, maleic anhydride, itaconic acid, and the salts thereof; monoesters and dialkyl esters; nitriles such as acrylonitrile and methacrylonitrile; amides such as diacetone acrylamide, acrylamide, and methacrylamide; olefin sulfonic acids such as ethylenesulfonic acid, allylsulfonic acid, methallylsulfonic acid, and the salts thereof; cations such as diallyldimethylammonium chloride, diallyldimethylammonium bromide, diallyldiethylammonium chloride, diallyldiethylammonium bromide, diallylethylmethylammonium chloride, and diethylethylmethylammonium bromide; alkyl vinylethers; vinyl compounds such as dimethylallyl vinyl ketone, N-vinylpyrrolidone, vinyl chloride, vinyl ethylene carbonate, 2,2-dialkyl-4-vinyl-1,3-dioxolanes, glycerol monoallyl ether, and 3,4-diacetoxy-1-butene; substituted vinyl acetates such as isopropenyl acetate and 1-methoxyvinyl acetate; vinylidene chloride, 1,4-diacetoxy-2-butene, vinylene carbonate, and the like.

Examples of the polyvinyl alcohols carrying a functional group introduced in the after-reaction include those having acetoacetyl groups introduced in reaction with diketene, those having polyalkylene oxide groups introduced in reaction with ethylene oxide, those having hydroxyalkyl groups introduced in reaction with an epoxy compound or the like, those obtained in acetalization reaction of an aldehyde compound carrying various functional groups with a polyvinyl alcohol, and the like.

[Other Components]

The pitch removal agent used in the method for producing paper of the present embodiment may contain components other than the polyvinyl alcohol described above in the range that does not impair the advantageous effects of the present embodiment. Examples of the other components contained in the pitch removal agent include antiseptics such as 2,2-dibromo-2-nitroethanol, 2-bromo-2-nitropropane-1, 3-diol, dichloro-3-n-octyl-4-isothiazolin-3-one, 2-n-octyl-4-isothiazolin-3-one, 1,3-diacetoxy-2-bromo-2-nitropropane, and oxalohydroximoyl dichloride. These antiseptics can be contained in an amount of about 0.001 to 0.1 mass % with respect to the total mass of the pitch removal agent.

The pitch removal agent in the present embodiment is normally used as dissolved in a solvent.

Examples of the solvents for use include pure water, diethylene glycol, diethylene glycol monomethylether, polyoxyalkylene alkyl ethers, and the like, and these solvents may be used alone or in combination of two or more.

The concentration of the pitch removal agent in an aqueous solution during storage and transportation is normally 1 to 30 mass %, preferably 5 to 20 mass %. It is normally 0.01 to 20 mass %, preferably 0.05 to 10 mass %, when it is added to the pulp slurry. When the concentration is too low, the concentration of the raw pulp may be influenced. When it is too high, the pitch removal agent may become less dispersible in the system.

The pitch removal agent described above is desirably added in the step of deinking waste paper by floatation and/or a step earlier, for prevention of the pitch fed into the paper-making step.

Because a polyvinyl alcohol having an average polymerization degree of 300 to 2500, a saponification index of 70 to 88 mol %, and an absorbance at a wavelength of 280 nm in the ultraviolet absorption spectrum of its 0.1 mass % aqueous solution of 0.1 Abs or more and having a relationship between the iodine absorbance y at a wavelength of 490 nm and the saponification index x satisfying the Numerical Formula (A) above is used as the pitch removal agent in the method for producing paper in the present embodiment, it is possible to selectively transfer the pitch with ink into the froth and discharge it out of the system in the step of deinking waste paper, particularly in a floatator.

In the floatator step, the pitch and the ink contained in the raw waste paper are less floatable when they are excessive large or small. Generally, the size of the pitch or the ink is considered favorable when it is 4 μm or more and several hundred μm or less. In contrast, the pitch removal agent used in the method for producing paper in the present embodiment can selectively flocculate a hardly-floating fine pitch with a size of 4 μm or less into particles of 4 μm or more and several hundred μm or less that are more reactive with the foams.

A polyvinyl alcohol containing residual acetic acid groups higher in block nature shows an action to absorb and flocculate the pitch. As a polyvinyl alcohol higher in the block nature of the residual acetic acid groups is used as the pitch removal agent in the method for producing paper in the present embodiment, it can form fine flocculation by absorbing the pitch and make the flocculation float easily with foams. As it is possible in this way to selectively transfer the pitch into froth with a floator, the amount of the pitch contained in the final raw material decreases, leading to reduction of the pitch-based troubles in the papermaking step.

The present embodiment may have the following aspects:
(1) a method for producing paper using waste paper, comprising adding, to the pulp slurry in the step of deinking the waste paper by floatation and/or a step earlier, a polyvinyl alcohol having an average polymerization degree of 300 to 2500, a saponification index of 70 to 88 mol %, and an absorbance at a wavelength of 280 nm in the ultraviolet absorption spectrum of its 0.1 mass % aqueous solution of 0.1 Abs or more and satisfying, when the iodine absorbance at a wavelength of 490 nm is designated as y (Abs) and the saponification index as x (mol %), the following Numerical Formula (A):

[Numerical Formula 3]

$$y = -0.0297x + b \quad (A)$$

(wherein, $70 \leq x \leq 88$ and $2.80 \leq b \leq 3.03$); and
(2) a pitch removal agent added to a pulp slurry during production of paper using waste paper in the step of deinking the waste paper by floatation and/or a step earlier, the pitch removal agent having an average polymerization degree of 300 to 2500, a saponification index of 70 to 88 mol %, and an absorbance at a wavelength of 280 nm in the ultraviolet absorption spectrum of its 0.1 mass % aqueous solution of 0.1 Abs or more and satisfying, when the iodine absorbance at a wavelength of 490 nm is designated as y (Abs) and the saponification index as x (mol %), the Numerical Formula (A) above.

EXAMPLES

Hereinafter, advantageous effects of the present invention will be described specifically with reference to the Examples and Comparative Examples of the present invention. However, it should be understood that the advantageous effects of the present invention are not limited to those described below.

Example 1

In Example 1, the pitch-removing efficiency of polyvinyl alcohols A to O prepared by the method shown below was examined.
<Preparation of Polyvinyl Alcohol A>
100 parts by mass of vinyl acetate, 1.2 parts by mass of acetaldehyde, 4.7 parts by mass of methanol, and 2,2'-azobisisobutylonitrile in an amount of 0.0071 mass % with respect to the vinyl acetate were placed in a polymerization tank and, after the internal tank was substituted with nitrogen, polymerization reaction was started and allowed to proceed for 7 hours, as the mixture was heated at the boiling point, and the reaction was terminated when the polymerization rate reached 80.5 mass %.

Then, unreacted vinyl acetate monomers were removed from the polymer solution obtained; and methyl acetate and methanol were added thereto, to give a solution (dielectric constant of entire solution: 25.3 CGS esu) containing polyvinyl acetate in an amount of 54 parts by mass, methyl acetate in an amount of 11.5 parts by mass, methanol in an amount of 34.4 parts by mass, and water in an amount of 0.14 parts by mass. The solution was then saponified in a kneader, using sodium hydroxide as catalyst; the polyvinyl alcohol slurry obtained was subjected to solid liquid separation; and the solid was dried in a drier to give a polyvinyl alcohol A.
<Preparation of Polyvinyl Alcohols B, D, E, F, G, H, I, and J>
Polyvinyl alcohols B, D to J were prepared similarly to above, except that the amount of the catalyst and the saponification period in the saponification reaction for preparation of polyvinyl alcohol A described above were modified.
<Preparation of Polyvinyl Alcohol C>
100 parts by mass of vinyl acetate, 1.2 parts by mass of acetaldehyde, 4.7 parts by mass of methanol, and 2,2'-azobisisobutylonitrile in an amount of 0.0071 mass % with respect to the vinyl acetate were placed in a polymerization tank. After the internal tank was substituted with nitrogen, polymerization reaction was started and allowed to proceed for 7 hours, as the mixture was heated at the boiling point, and the reaction was terminated when the polymerization rate reached 80.5 mass %.

Then, unreacted vinyl acetate monomers were removed from the polymer solution obtained; and methyl acetate and methanol were added thereto, to give a solution (solution dielectric constant: 21.0 CGS esu) containing polyvinyl acetate in an amount of 50.0 parts by mass, methyl acetate in an amount of 21.4 parts by mass, methanol in an amount of 28.4 parts by mass, and water in an amount of 0.15 parts by mass. The solution was then saponified in a kneader, using sodium hydroxide as catalyst. The polyvinyl alcohol slurry obtained was subjected to solid liquid separation and the solid obtained was dried in a drier, to give a polyvinyl alcohol C.
<Preparation of Polyvinyl Alcohol K>
100 parts by mass of vinyl acetate, 1.2 parts by mass of acetaldehyde, 4.7 parts by mass of methanol, and 2,2'-azobisisobutylonitrile in an amount of 0.0071 mass % with respect to the vinyl acetate were placed in a polymerization tank. After the internal tank was substituted with nitrogen, polymerization reaction was started and allowed to proceed for 7 hours, as the mixture was heated at the boiling point, and the reaction was terminated when the polymerization rate reached 80.5 mass %.

Then, unreacted vinyl acetate monomers were removed from the polymer solution obtained; and methyl acetate and methanol were added thereto, to give a solution (dielectric constant of entire solution: 12.8 CGS esu) containing polyvinyl acetate in an amount of 29.9 parts by mass, methyl acetate in an amount of 53.8 parts by mass, methanol in an amount of 16.2 parts by mass, and water in an amount of 0.20 parts by mass. The solution was then saponified in a kneader, using sodium hydroxide as catalyst. The polyvinyl alcohol slurry obtained was subjected to solid liquid separation and the solid was dried in a drier to give a polyvinyl alcohol K.

<Preparation of Polyvinyl Alcohols L, M, N, and O>

Vinyl acetate was polymerized in methanol, to give a polyvinyl acetate methanol solution. The polyvinyl acetate methanol solution obtained was saponified using sodium hydroxide as catalyst, to give a polyvinyl alcohol slurry. The polyvinyl alcohol slurry obtained was subjected to solid liquid separation and the solid obtained was dried in a drier to give each of polyvinyl alcohols L to O.

<Measurement of Absorbance at 280 nm>

The absorbance of each of the polyvinyl alcohols A to O at 280 nm in the ultraviolet absorption spectrum was determined. Specifically, 0.2 mass % of polyvinyl alcohol was dispersed in water at normal temperature as the mixture was well agitated, and the mixture was heated to 75° C. Then, the dispersion was dissolved completely by agitation for 3 hours and cooled to normal temperature as agitated. After the resin content of the solution obtained was determined, the mixture was adjusted to 0.1 mass % aqueous polyvinyl alcohol solution. The sample solution adjusted was placed in a cell for determination of absorbance.

<Confirmation of Residual Acetic Acid Groups>

The conformation of the residual acetic acid groups in each of the polyvinyl alcohols A to O was examined by iodine absorbance. Specifically, pure water (11 ml) was added to the 0.1 mass % aqueous polyvinyl alcohol solution (5 ml), giving a solution having a total volume of 16 ml. The solution was kept at 25° C. in a constant-temperature water tank. N/1000 iodine solution (4 ml) was added thereto, and the mixture was agitated and immersed again in the constant-temperature tank for 20 minutes. The resulting colored sample solution was placed in a cell previously adjusted to 25° C. and the iodine absorbance was determined at a wavelength of 490 nm.

The results above are summarized in the following Table 1.

nature of the residual acetic acid groups. Alternatively, polyvinyl alcohols L to O, which have an average polymerization degree and a saponification index within the ranges of the present invention but have a relationship between the saponification index x and the iodine absorbance y outside the range of the present invention, were lower in the block nature of the residual acetic acid groups than polyvinyl alcohols A to K.

FIG. 1 is a figure showing the relationship between the saponification index and the iodine absorbance at 490 nm. As shown in FIG. 1, polyvinyl alcohols A to K had a relationship between the saponification index x and the iodine absorbance y satisfying the condition of: y=−0.0297x+b (wherein, 70≤x≤88, 2.80≤b≤3.03). On the other hand, polyvinyl alcohols L to O had an intercept b outside the range of b: 2.80≤b≤3.03, when the saponification index x and the iodine absorbance y were assigned into the Formula: y=−0.0297x+b.

<Evaluation of Pitch-Removing Efficiency>

An acrylic adhesive REGITEX A-6001 (produced by Regitex Co., Ltd.) was dissolved in pure water as model pitch at a concentration of 10 mg/L, to give a solution. Each of the polyvinyl alcohols A to O shown in Table 1 above was dissolved in water as pitch removal agent, to give an aqueous solution. The concentration of the aqueous solution was 10 mg/L.

The aqueous solution was added to the solution obtained above and, for dying the model pitch, Fluorol 555 (produced by Exciton) was additionally added thereto in an amount of 0.5 mass % with respect to the solution containing the polyvinyl alcohol added thereto, to give each of the mixture solutions of Examples 1 to 11 and Comparative Examples 2 to 5.

The mixture solution of Comparative Example 1 containing no polyvinyl alcohol and the mixture solutions of

TABLE 1

| | | PVA | | | | |
|---|---|---|---|---|---|---|
| | Kind | Saponification index (mol %) | Polymerization degree | Absorbance (Abs. at 280 nm) | Iodine absorbance y (Abs. at 490 nm) | Intercept b |
| Example 1 | A | 72.7 | 750 | 0.35 | 0.71 | 2.87 |
| Example 2 | B | 76.9 | 750 | 0.36 | 0.61 | 2.89 |
| Example 3 | C | 78.6 | 750 | 0.35 | 0.62 | 2.95 |
| Example 4 | D | 80.4 | 750 | 0.35 | 0.54 | 2.93 |
| Example 5 | E | 81.0 | 750 | 0.36 | 0.54 | 2.95 |
| Example 6 | F | 82.2 | 750 | 0.34 | 0.42 | 2.86 |
| Example 7 | G | 84.9 | 750 | 0.36 | 0.42 | 2.94 |
| Example 8 | H | 85.6 | 750 | 0.34 | 0.30 | 2.84 |
| Example 9 | I | 86.1 | 750 | 0.36 | 0.35 | 2.90 |
| Example 10 | J | 87.9 | 750 | 0.34 | 0.33 | 2.94 |
| Example 11 | K | 79.0 | 750 | 0.27 | 0.65 | 3.00 |
| Comparative Example 1 | — | — | — | — | — | — |
| Comparative Example 2 | L | 72.0 | 500 | 0.01 | 0.65 | 2.79 |
| Comparative Example 3 | M | 79.7 | 300 | 0.02 | 0.36 | 2.72 |
| Comparative Example 4 | N | 80.4 | 500 | 0.01 | 0.35 | 2.73 |
| Comparative Example 5 | O | 87.8 | 550 | 0.01 | 0.15 | 2.76 |

As shown in Table 1 above, polyvinyl alcohols A to K, which have an average polymerization degree, a saponification index, and a relationship between the saponification index x and the iodine absorbance y respectively within the ranges of the present invention, were higher in the block Examples 1 to 11 and Comparative Examples 2 to 5 prepared by the method described above were analyzed under a fluorescence microscope (BX53-34-FL-3-D manufactured by Olympus Corporation) for examination of the pitch flocculation and dispersion efficiency. FIGS. 2 to 17 are fluorescence micrographs of the mixture solutions of Examples and Comparative Examples.

Figure 13:
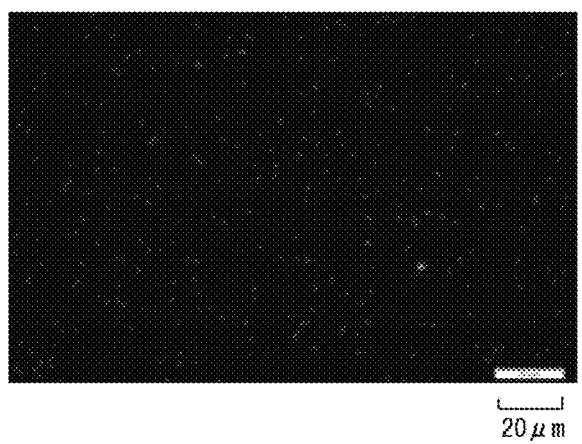
FIG. 13 is a photograph showing the solution prepared in Comparative Example 1, as observed under fluorescence microscope.
Figure 14:
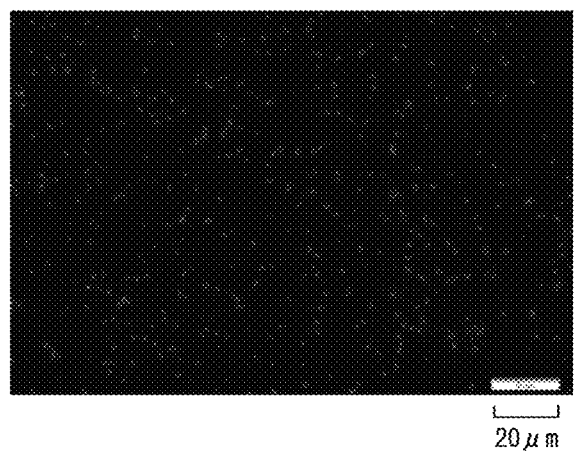
FIG. 14 is a photograph showing the solution prepared in Comparative Example 2, as observed under fluorescence microscope.
Figure 15:
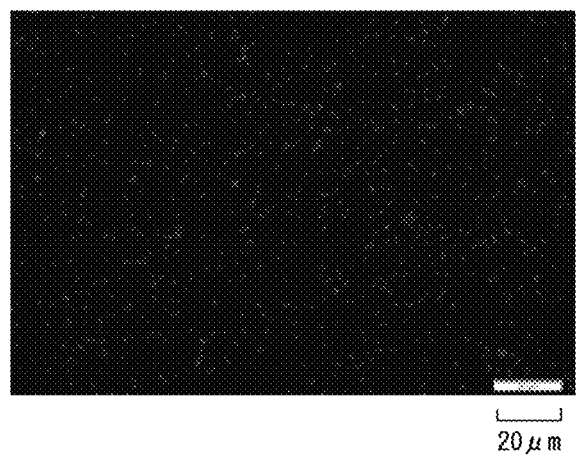
FIG. 15 is a photograph showing the solution prepared in Comparative Example 3, as observed under fluorescence microscope.
Figure 16:
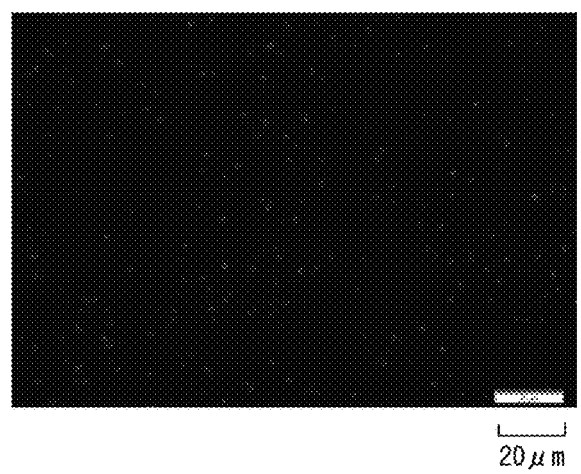
FIG. 16 is a photograph showing the solution prepared in Comparative Example 4, as observed under fluorescence microscope.
Figure 17:
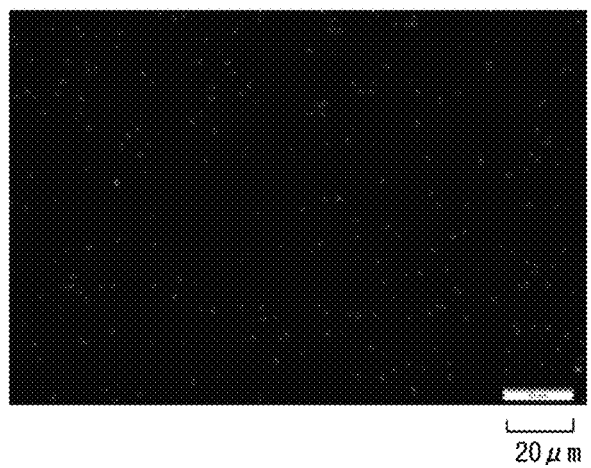
FIG. 17 is a photograph showing the solution prepared in Comparative Example 5, as observed under fluorescence microscope.

As shown in FIG. 13, in the case of the mixture solution of Comparative Example 1 containing no polyvinyl alcohol, the model pitch was found to be dispersed in water. As shown in FIGS. 14 to 17, similarly in the case of the mixture solutions of Comparative Examples 2 to 5, which respectively contain polyvinyl alcohols L to O not satisfying the ranges of the present invention, the model pitch was found to be dispersed in water. The size of the model pitch in Comparative Examples 2 to 5 was about 1 to 3 µm, which was almost equivalent to that of Comparative Example 1.

In contrast, as shown in FIGS. 2 to 12, in the case of the mixture solutions of Examples 1 to 11, which respectively contain polyvinyl alcohols A to K within the scope of the present invention, the model pitch was found to be flocculated. The size of the flocculation in these Examples was about several ten µm. The results above show that it is possible to convert pitch into flocculation of 4 µm or more and several hundred µm or less in size by using a polyvinyl alcohol within the scope of the present invention.

Example 2

A floatation test was then performed in Example 2 of the present invention. In the present Example, a waste paper material of newspapers and flyers mixed at a mass ratio of 7:3 was macerated in tap water to a Canadian standard freeness of 200 mL and a suspended substance (SS) concentration of 1 mass %, to give a test slurry.

Sodium hydroxide (3.5 mass % to the pulp dry mass), a deinking agent (DI7250 produced by Kao Corporation, 0.14 mass % to the pulp dry mass), and each of the polyvinyl alcohols A to O shown in Table 1 above at a predetermined concentration were added in that order to the test slurry previously adjusted to 40° C. The mixture was subjected to floatation in a small desk-top floatator (MT-5L, manufactured by Ishikawajima Industrial Machinery Co., Ltd.) under an air flow of 2 L/minute and a medium-agitating condition for 3 minutes.

The mass of the froth recovered from the floatation treatment was then determined and the amount of SS was determined according to JIS K0102. The pitch concentration in the froth was determined, as the pitch was extracted using a mixed solvent of chloroform (analytical grade, produced by Kishida Chemical Co., Ltd.) and benzene (analytical grade, produced by Kishida Chemical Co., Ltd.) at a ratio of 1:1 in a high-speed solvent-extracting machine (ASE350, manufactured by Nippon Dionex K. K.). The results above are summarized in the following Table 2.

TABLE 2

| | | PVA | | Pitch |
|---|---|---|---|---|
| | No. | Kind | Addition amount (mg/L) | SS in froth (g) | concentration in froth (mg/L) |
| Example | 20-1 | A | 5 | 5.95 | 491 |
| | 20-2 | | 10 | 5.44 | 506 |
| | 20-3 | | 20 | 5.11 | 643 |
| | 21-1 | B | 5 | 5.52 | 552 |
| | 21-2 | | 10 | 6.02 | 547 |
| | 21-3 | | 20 | 5.69 | 689 |
| | 22-1 | C | 5 | 5.67 | 505 |
| | 22-2 | | 10 | 6.17 | 514 |
| | 22-3 | | 20 | 5.71 | 526 |

TABLE 2-continued

| | | PVA | | Pitch |
|---|---|---|---|---|
| | No. | Kind | Addition amount (mg/L) | SS in froth (g) | concentration in froth (mg/L) |
| | 23-1 | D | 5 | 5.10 | 576 |
| | 23-2 | | 10 | 5.76 | 587 |
| | 23-3 | | 20 | 5.36 | 692 |
| | 24-1 | E | 5 | 5.59 | 580 |
| | 24-2 | | 10 | 4.93 | 597 |
| | 24-3 | | 20 | 4.62 | 658 |
| | 25-1 | F | 5 | 4.54 | 718 |
| | 25-2 | | 10 | 4.50 | 686 |
| | 25-3 | | 20 | 4.11 | 612 |
| | 26-1 | G | 5 | 4.38 | 688 |
| | 26-2 | | 10 | 4.51 | 699 |
| | 26-3 | | 20 | 4.03 | 564 |
| | 27-1 | H | 5 | 4.37 | 676 |
| | 27-2 | | 10 | 4.56 | 702 |
| | 27-3 | | 20 | 4.42 | 669 |
| | 28-1 | I | 5 | 5.19 | 564 |
| | 28-2 | | 10 | 5.33 | 605 |
| | 28-3 | | 20 | 5.29 | 659 |
| | 29-1 | J | 5 | 5.43 | 514 |
| | 29-2 | | 10 | 5.98 | 489 |
| | 29-3 | | 20 | 6.33 | 521 |
| | 30-1 | K | 5 | 4.69 | 546 |
| | 30-2 | | 10 | 4.94 | 522 |
| | 30-3 | | 20 | 5.82 | 665 |
| Comparative Example | 40 | — | 0 | 6.08 | 365 |
| | 41-1 | L | 5 | 6.08 | 465 |
| | 41-2 | | 10 | 6.13 | 496 |
| | 41-3 | | 20 | 6.52 | 511 |
| | 42-1 | M | 5 | 6.24 | 514 |
| | 42-2 | | 10 | 6.13 | 525 |
| | 42-3 | | 20 | 6.40 | 487 |
| | 43-1 | N | 5 | 6.14 | 569 |
| | 43-2 | | 10 | 6.45 | 599 |
| | 43-3 | | 20 | 6.82 | 633 |
| | 44-1 | O | 5 | 6.09 | 471 |
| | 44-2 | | 10 | 6.33 | 446 |
| | 44-3 | | 20 | 6.01 | 498 |

As shown in Table 2 above, each of the slurries of Examples and Comparative Examples, which contained polyvinyl alcohol, had a pitch concentration in the recovered froth higher than that of the slurry of Comparative Example 40, which contained no polyvinyl alcohol. However, the amounts of SS in the froths of Comparative Examples 41 to 44 were equivalent to or higher than that of Comparative Example 40. In these Comparative Examples, it seems that there was no selectivity for pitch and the amount of the pitch recovered was increased by increase of foaming.

In contrast, in Examples 20 to 30, it was possible to raise the pitch concentration in the froth to a value higher than those of Comparative Examples 41 to 44, while reducing the SS amount in the froth to a value equivalent or lower than that of Comparative Example 40.

Example 3

Pitch-removing efficiencies of the polyvinyl alcohols A to O were evaluated based on the results of Examples 1 and 2 described above. In the evaluation above, polyvinyl alcohols forming a flock containing pitch in the size that is removable with a floatator (4 µm or more) and favorable in the floatation test were considered favorable (◯) and those giving finely dispersed pitch or unfavorable in the floatation test were considered unfavorable (x). The results are summarized in the following Table 3. The results obtained when no polyvinyl alcohol was added were also shown as a Comparative Example in the following Table 3.

TABLE 3

| | Kind of PVA | Pitch-removing efficiency |
|---|---|---|
| Example | A | ○ |
| | B | ○ |
| | C | ○ |
| | D | ○ |
| | E | ○ |
| | F | ○ |
| | G | ○ |
| | H | ○ |
| | I | ○ |
| | J | ○ |
| | K | ○ |
| Comparative Example | — | x |
| | L | x |
| | M | x |
| | N | x |
| | O | x |

The results show that the pitch removal agent containing a polyvinyl alcohol according to the present invention can selectively transfer the pitch into froth without increasing the amount of foams in the floatator.

The invention claimed is:

1. A method for producing paper using waste paper, comprising:
   polymerizing a compound in a presence of at least one chain-transfer agent containing an aldehyde, thereby obtaining polyvinyl acetate;
   saponifying the polyvinyl acetate, thereby obtaining a polyvinyl alcohol; and
   adding, to a pulp slurry in a step of deinking the waste paper by floatation and/or a step earlier, the polyvinyl alcohol having an average polymerization degree of 300 to 2500, a saponification index of 70 to 88 mol %, and an absorbance at a wavelength of 280 nm in an ultraviolet absorption spectrum of its 0.1 mass % aqueous solution of 0.2-1.0 Abs and satisfying, when an iodine absorbance at a wavelength of 490 nm is designated as y (Abs) and the saponification index as x (mol %), the following Numerical Formula (A):

[Numerical Formula 1]

$$y = -0.0297x + b \quad \quad (A)$$

(wherein, $70 \leq x \leq 88$ and $2.80 \leq b \leq 3.03$).

2. The method according to claim 1, wherein the iodine absorbance is measured at 25° C.

3. The method according to claim 1, wherein the absorbance at the wavelength of 280 nm in the ultraviolet absorption spectrum of its 0.1 mass % aqueous solution of 0.2-1.0 Abs indicates double bonds adjacent to terminal carbonyl groups contained in a structure of the polyvinyl alcohol.

4. The method according to claim 1, wherein the absorbance at the wavelength of 280 nm in the ultraviolet absorption spectrum of its 0.1 mass % aqueous solution is 0.3-0.5 Abs.

5. The method according to claim 1, wherein the aldehyde is one selected from the group consisting of acetaldehyde, benzaldehyde, propionaldehyde, and n-butyraldehyde.

* * * * *